United States Patent [19]

Lutaenko et al.

[11] Patent Number: 4,850,876
[45] Date of Patent: Jul. 25, 1989

[54] TRAINING DEVICE FOR PRACTICING EMERGENCY LIFE SAVING TECHNIQUES

[75] Inventors: Vyacheslav F. Lutaenko; Jury B. Matsievsky; Valery A. Kostromitin; Grigory M. Abramovich, all of Irkutsk; Igor F. Bogoyavlensky, Moscow, all of U.S.S.R.

[73] Assignee: Raionnoe Energeticheskoe Upravlenie "Irkutskenergo", Irkutsk, U.S.S.R.

[21] Appl. No.: 96,017
[22] PCT Filed: Nov. 26, 1985
[86] PCT No.: PCT/SU85/00092
   § 371 Date: Jul. 20, 1987
   § 102(e) Date: Jul. 20, 1987
[87] PCT Pub. No.: WO87/03407
   PCT Pub. Date: Jun. 4, 1987
[51] Int. Cl.$^4$ ............................................. G09B 23/28
[52] U.S. Cl. ...................................................... 434/265
[58] Field of Search ......................................... 434/265

[56] References Cited

U.S. PATENT DOCUMENTS

| | | | |
|---|---|---|---|
| 3,049,811 | 8/1962 | Ruben | 434/265 |
| 3,562,924 | 2/1971 | Baermann et al. | 434/265 |
| 3,736,362 | 5/1973 | Laerdal | 434/265 |
| 3,872,609 | 3/1975 | Smrcka | 434/265 |
| 4,001,950 | 1/1977 | Blumensaadt | 434/265 |
| 4,331,426 | 5/1982 | Sweeney | 434/265 |
| 4,360,345 | 11/1982 | Hon | 434/265 |
| 4,484,896 | 11/1984 | Kohnke | 434/265 |
| 4,611,998 | 9/1986 | Ramamurthy | 434/265 |

FOREIGN PATENT DOCUMENTS

| | | |
|---|---|---|
| 2144931 | 3/1972 | Fed. Rep. of Germany . |
| 343419 | 3/1972 | Sweden . |
| 463137 | 3/1975 | U.S.S.R. . |

OTHER PUBLICATIONS

Ambu CPR Simulator, Advertising Booklet, 1984, Denmark.

Primary Examiner—Leo P. Picard
Attorney, Agent, or Firm—Fleit, Jacobson, Cohn & Price

[57] ABSTRACT

A training device for practicing emergency life saving techniques is a manikin (1) comprising several hinged units, such as a head unit (17) equipped with a device for protection of trainees against cross infection, a neck unit (18), and a torso unit (19) which is made hollow to accommodate a rib cage unit and an abdomen unit, and a system (2) for simulation and control of reanimation states, which is electrically connected to the manikin (1) and comprises a reanimation state control unit (4), a videosimulator unit (3) for simulation of vital internal human organs, and a system of simulators of revivification process, installed in the manikin (1).

18 Claims, 5 Drawing Sheets

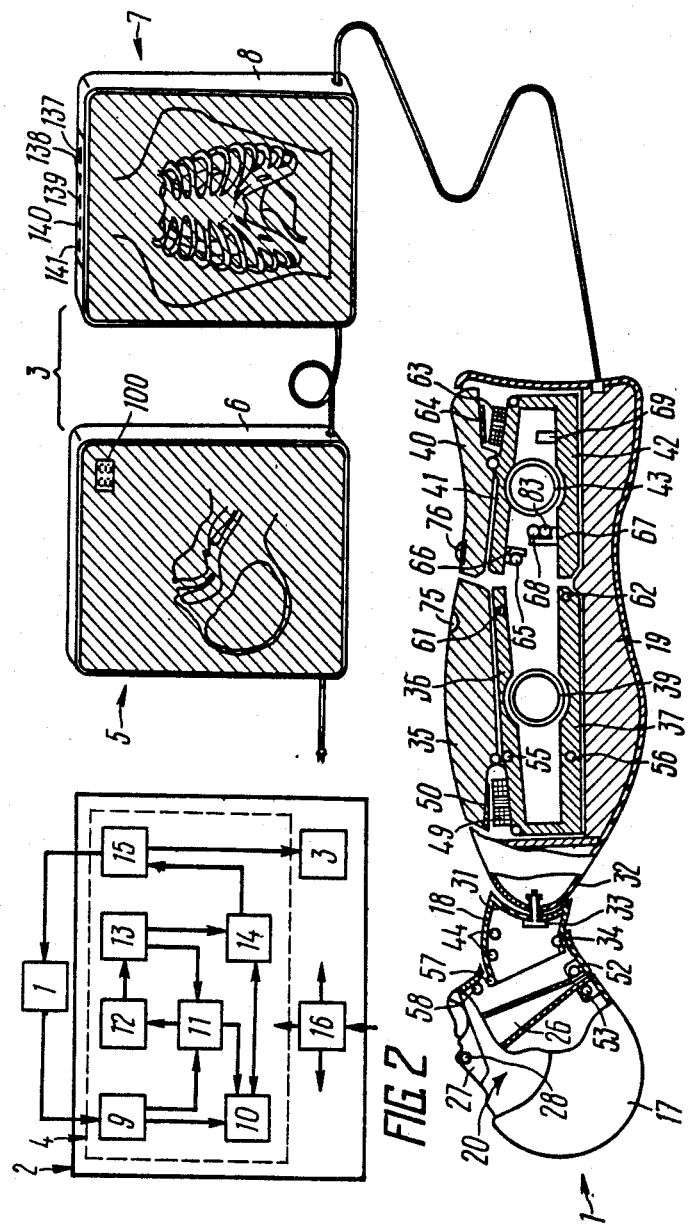

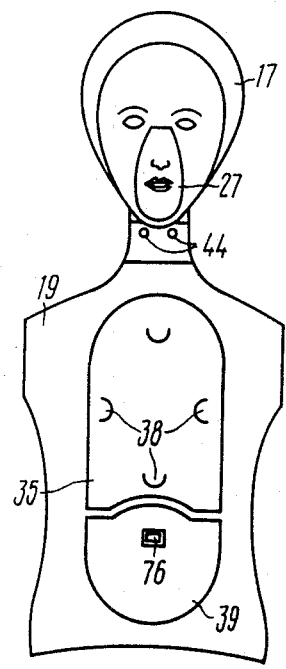
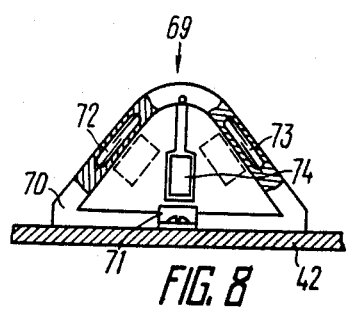
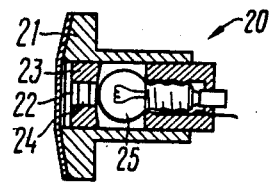
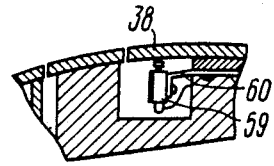
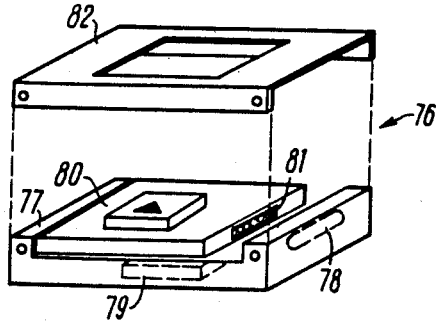

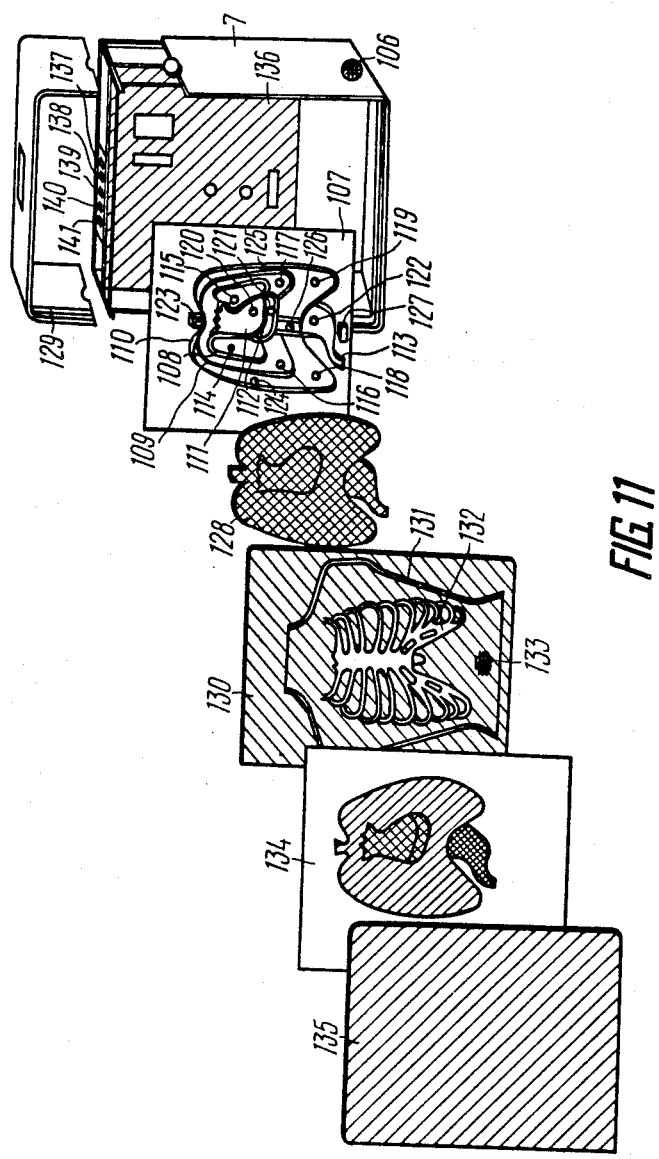

TRAINING DEVICE FOR PRACTICING EMERGENCY LIFE SAVING TECHNIQUES

TECHNICAL FIELD

This invention relates to the field of medicine and, in particular, to training devices for practicing emergency life saving techniques before and after admission to the hospital in cases of cardiac arrest and respiratory standstill caused by serious injuries as a result of domestic and industrial accidents, electric contacts, traffic accidents, drowning accidents, poisonings or other accidents.

BACKGROUND ART

However perfect the emergency medical service might be now or in the future, it can still come too late in cases of cardiac arrest or respiratory failure. It is a matter of only 3 to 5 minutes, that is the time span between the clinical death which is reversible and irreversible damage to the central nervous system and several other organs characteristic of biological death. Any meaningful help can only come from people who happen to be close to the site of the accident.

Practical application of life saving techniques has proved to be extremely effective in the street, on the shore, at home, at an enterprise, and in other places. Many thousands of lives saved by emergency resuscitation methods is an excellent example of this.

Statistical data demonstrate that in the United States alone over 25 thousand people were saved by the end of the 60s by persons having no medical background. It is therefore important socially and otherwise that as many people as possible are trained to perform uncomplicated but effective life saving techniques.

It should be pointed out that such training without practical experience, with practicing on specially designed life saving training devices is extremely inefficient. A person cannot acquire proper skills usable in emergency situations. Practical experience has demonstrated that the practicing process can only be made effective when training devices are employed, which can simulate a real life situation and produce a stable dynamic stereotype of movements required for the trainees to be able to successfully perform on the site of an accident without any special equipment.

Known in the art is a device for practicing techniques of cardiac-pulmonary resuscitation (cf., FRG Pat. No. 2144931, filed Sept. 8, 1971, Cl. G 09 B 23/32), comprising a human manikin composed of a head mock-up equipped with a movable lower jaw, a nose with compressible nostril wings, an infection protection system made as a detachable face mask, a resilient bag placed inside the head mock-up and communicating with the mouth and nose openings; a neck mock-up hinged to the head mock-up and a mock-up of the trunk without the upper and lower extremities with a rib cage equipped with resilient elements arranged beneath the front wall and lungs simulated by a resilient container connected by an air duct to the head mock-up inner space. This training device is used by an instructor to teach trainees techniques of cardiac-pulmonary resuscitation, including assisted respiration and external chest massage. For artificial respiration the trainee brings the head of the manikin back, clamps the nostril wings, and, fitting his mouth over the manikin's mouth, vigorously exhales. The air breathed in fills the elastic bag which expands and forces the air from the mock-up head into the elastic container of the manikin's lungs. The elastic container simulating the lungs lifts the front wall of the manikin's rib cage. The trainee can see if artificial respiration is being done properly by this rise of the rib cage. For external chest massage the trainee places his both hands on the rib cage of the manikin and starts regular pressing. In this case only the instructor can judge if the trainee is doing his job properly.

This training device is deficient in that it has to be equipped with a large number of masks and elastic bags for individual protection, which does not fully exclude infection foci being formed inside the manikin considering imperfect quality of elastic bags and inaccurate fitting of such bags inside the manikin's head mock-up.

Moreover, this device provides no means for monitoring such obligatory reanimation parameters as the volume of intake air, air penetration into the stomach when the head of the mannequin is not sufficiently forced back, the number of ventilation excursions per time unit, force of heart compressions, number of heart compressions per unit of time. The trainee cannot therefore make a self-analysis of his actions and master the skill of controlling the volume of inbreathed air, the force and rate of compressions during cardiac massage..

Also known in the art is a device for practicing techniques of cardiac-pulmonary resuscitation (cf., Swedish Pat. No. 343419, Cl. G 09 B 23/20, filed Nov. 10, 1958), comprising a manikin made up of a head mock-up with a nasal-oral cavity, a flexible lower jaw, a nose with flexible nostril wings, and a protection system made as a mask applied on the face area of the manikin's head mock-up; a neck mock-up equipped with a device for constricting the air ducts and hinged with the mock-up of the head and with the mock-up of the body trunk having an elastically deformed front wall, lungs simulated by an elastic container connected by the air duct with the nasal-oral cavity and the abdomen having a movable front wall, and a stomach located below this front wall and made as another elastic container connected by an air duct with the nasal-oral cavity of the head mock-up.

An instructor should necessarily supervise training in artificial respiration and external cardiac massage on this device.

To perform artificial respiration the trainee has to tilt the head back. The air duct of the stomach cavity is constricted, while the air duct of the lung cavity is released. The trainee then presses together the nostril wings and makes an energetic expiration into the manikin's mouth. The air breathed into the nasal-oral cavity is forced into the lung cavity of the dummy. The trainee can control the artificial respiration procedure by observing the rise of the front wall of the dummy rib cage. If the head of the dummy is not forced back enough, the air duct to the lungs is constricted while the air duct to the stomach is released, and the air breathed in enters the stomach cavity of the manikin and lifts the front wall of the dummy abdomen. The trainee can, therefore, notice the movement of the front wall of the abdomen and realize he is not doing properly. To perform external chest massage the trainee places his hands on the front wall of the dummy rib cage and makes rhythmical compressions.

This device, as compared to the previous one, provides an additional advantage which consists in that the trainee can, without the instructor, check if artificial respiration is performed properly by the visible movement of the front wall of the dummy abdomen. However, quantitative parameters of resuscitation, such as the volume of intake air and the pressure exerted during chest massage, cannot be monitored. The pulse is not simulated at all. No indication is given as to the skeletal integrity of the manikin rib cage in case the trainee's hands are misplaced. This reduces the efficiency of training in techniques of external cardiac massage and artificial respiration.

This prior art device is also deficient in that it provides no indication of air penetrating into the dummy stomach when it is forced into the lungs. This makes training in artificial ventilation of lungs less effective. The device also provides no indication of the duration of basic resuscitation procedures, such as duration of ventilation excursion during artificial respiration, duration of heart compression during external cardiac massage, duration of intervals between the ventilation excursion and heart compression when artificial respiration and external chest massage are performed simultaneously. In other words, one of the vital factors in emergency life saving techniques, the time factor, is not taken into consideration.

Also well known in the art is a simulator for practicing emergency life saving techniques, including assisted respiration and external cardiac massage, manufactured by Ambu (CPR Simulator, Advertising booklet, 1984, Denmark), which possesses many features of the proposed training device. This simulator is the closest prior art device.

This simulator is a manikin connected to monitoring instruments recording circulation parameters, including a hemoglobinometer, an oxyhemometer, and manometers measuring the applied pressure and the lung expanding force. The manikin is a torso with a head but devoid of the upper and lower extremities, and a mock-up of the rib cage. The head mock-up includes dispensable nose-and-mouth masks ensuring protection against cross infection of trainees. The manikin of the simulator is also equipped with a simulator of forced pulse in the area of the carotid arteries, a simulator of the xiphoid cartilage or metasternum, a detector of hand position and compression depth during heart compressions. This simulator can be used to practice mouth-to-mouth and mouth-to-nose resuscitation and cardiac massage. Filling of the rib cage and abdomen is simulated by elastic containers installed in respective locations and connected by air passages to the cavity in the simulation head of the manikin. It should be noted that this simulator is deficient in that it provides only partial control or no control at all over such erroneous actions as:

incorrect position of the manikin head during insufflation; the trainee and his instructor cannot find the reasons of ineffective artificial respiration, particularly of inflation of the stomach;

dangerous position of trainee's hands on the chest of the manikin during external heart massage, which in real life conditions may be the reason of fractures of the breast bone, ribs, heavy injuries to internal organs in the rib cage; the trainee cannot master the technique of external heart massage by himself;

leaving the manikin abdomen constrained by clothing which limits the freedom of movement of internal organs in the abdominal cavity; in real life conditions this can lead to extremely serious injuries to these organs during external heart massage.

This simulator cannot be used to train people in removing the air from the stomach of the victim. In practice, the air in the stomach prevents lungs from inflating, may cause regurgitation of the stomach contents and obstruction of the upper respiratory tracts.

This prior art simulator is also deficient in that it provides no opportunity for the trainees to assess the effectiveness of their manipulations by evident spontaneous indications of revivification (visible movements of the front wall of the rib cage, pulse, pupil contraction) and provides no means for the analysis of the revivification situation corresponding to the real life situation. The efficiency of training, particularly in non-medical groups, is therefore not sufficiently high.

This prior art simulator provides no opportunity for a large audience to participate in the teaching process by watching functioning models of basic internal human organs, such as brain, heart, lungs, upper respiratory tracts, stomach, which are adequate to the manipulations with the manikin. The teaching process cannot be made expedient for a large number of people and their knowledge of the life saving techniques are only superficial without understanding of the pathophysiological situation of human terminal states.

Moreover, this simulator has no devices for assessing the actions of trainees and automatic evaluation of their performance on the basis of time of the number of errors. The teaching process cannot, therefore, be self-instruction. The assessment cannot be made objective.

These drawbacks reduce the efficiency of training in emergency life saving techniques, this training becomes actually a conventional type of practicing where much depends on the skill of the instructor.

DISCLOSURE OF THE INVENTION

An object of the invention is to provide a training device for practicing emergency life saving techniques, which is constructed so as to bring the teaching process as close to real life conditions as possible.

This object is achieved in that in a training device for practicing emergency life saving techniques, comprising a manikin including: a head unit equipped with a protection device intended to protect trainees against cross infection; a neck unit having pulse simulators and hinged to the head unit and a torso unit made up of a simulation rib cage equipped with a resiliently compressible front panel under which a simulator of forced respiratory movements is located and an abdomen unit equipped with resiliently compressible front panel under which a stomach inflation simulator is arranged; a reanimation state simulation and control system, according to the invention, the nasal-oral cavity of the head unit is made as a dispensable funnel whose base is a face mask, while the internal space of the funnel communicates with openings provided in the area of the nostril wings and mouth, thus forming a nasal-oral cavity, the narrow portion of the funnel becoming a hollow cylinder by which the nasaloral cavity communicates with the atmosphere, a through opening being made in the back of the head unit and a supporting tube is mounted opposite said through opening, the internal diameter of this supporting tube matching the diameter of the cylinder of the replaceable funnel; the neck unit is made as a hollow cylinder with through openings being provided in the wall thereof in the area of the carotid arteries, the upper base of said cylinder is located in the head unit, while the lower base thereof is a concave hemisphere featuring an oval opening, the external surface of the cylinder is shaped as a human neck; the torso unit is made hollow and houses: a rib cage unit and an abdomen unit, the upper part of the torso unit ends with a convex hemisphere with an opening, the curvature of the hemisphere matches the curvature of the concave hemisphere of the lower base of the cylinder of the neck unit and is slidedly mated therewith, the head unit is provided with a hinge in the back of the head, which is secured on the back side of the neck unit cylinder, the area of the chin of the head unit is adapted, to freely move over the surface of the cylinder of the neck unit.

This makes it possible to model most realistically parts of a human body, which are required for training, and to bring the training process as close to real life conditions as possible At the same time, this provides a 100% guarantee against transferring infection from one trainee to another.

It is advisable that the rib cage unit should be made as several rigid panels arranged one under another, said front, middle and back panels being hinged together. Petal-shaped cuts are made in the front rigid panel in the area of the manubrium sternum, lateral rib ends, and metasternum, while slots are made in the back rigid panel to accommodate resiliently compressible elements which determine the resistance of the front panel of the manikin rib cage unit to compressions during external heart massage. This makes it possible to teach trainees to vary the force applied during massage and to detect the state of the victim by the presence or absence of spontaneous breathing a in life-like emergency situations.

It is possible that the abdoment unit should be made as front, middle, and rear rigid panels arranged one under another and hinged together, a model of a belt buckle should be secured on the external surface of the front panel of the abdomen unit, and slots should be provided in the rear rigid panel to accommodate resiliently compressible elements which determine the resistance of the front panel of the abdomen unit during stomach decompression.

This makes it possible for trainees to learn how to prepare the victim for massage and how to apply proper pressure to remove the air from the stomach.

It is possible that the training device should be equipped with a system for simulation and control of reanimation states, which comprises a control unit of reanimation states, a unit of videosimulators of basic vital human organs, and a system of simulators of life-like revivification, which comprises: an eye simulator comprising a housing whose visible part is a lens simulating the eye ball and iris, and, mounted inside this housing one under another, are a light filter simulating a wide pupil, a light guide with a cylinder simulating a narrow pupil, and a filament lamp; spontaneous pulse simulators arranged in the neck unit in the area of the carotid arteries, two simulators for each artery, each simulator comprising a coil installed inside the neck unit cylinder so that the opening of the coil and the through opening in the cylinder wall are coaxial, a hollow core being pressed into the coil, while another core is adapted for logitudinal motion along the axis of said coil; a simulator of spontaneous breathing motions, which comprises a coil with a core, and coil being installed in the middle rigid panel of the rib cage unit, a metal plate being secured above said coil on the internal surface of the front panel of the same unit and adapted for operative interaction with said coil.

This makes it possible to introduce into the teaching process real life diagnostic indications of reanimation states of the victim, to simulate spontaneous reanimation which is the criterion for assessment of the proficiency of the trainee.

It is advisable that the manikin should be provided with an artificial respiration transducer connected to the reanimation state simulation and control system, which comprises a metal barrel adapted to move logitudinally in the cylinder of the replaceable funnel and operatively interacting with a permanent magnet and a fereed contact installed one opposite the other in the wall of the supporting tube secured in the back of the head unit, a calibrated opening being provided in the bottom of said metal barrel in order to change the volume of inlet air.

This makes it possible to ensure control of ventilation excursions performed by trainees without an instructor, reanimation feedback, and objective assessment of artificial respiration techniques.

It is advisable that the manikin should be equipped with an external heart massage transducer electrically connected to the reanimation state simulation and control system, which comprises a permanent magnet installed on the middle rigid panel of the rib cage unit and a ferreed contact installed beneath said permanent magnet on the rear rigid panel of the same unit, which is operatively interacting with said permanent magnet during external heart massage.

This makes it possible to ensure monitoring of cardiac compressions during external heart massage with the participation of an instructor, feedback of the real-life "revivification" of the manikin, and objective assessment of the external heart massage techniques.

It is advisable that the manikin should be provided with a manikin head position detector electrically connected to the reanimation state simulation and control system and comprising a ferreed contact installed in the area of the head unit and a permanent magnet installed on the upper base of the neck unit cylinder, said detector operatively interacting with said ferreed contact when the head unit is tilted back to the maximum.

This makes it possible for the trainee to learn one of the basic skills—freeing the passage of the upper respiratory tracts. Ignorance of this procedure in practice often lead to tragic results.

It is possible that the manikin should be equipped with a system simulating injuries of the skeletal carcass of the rib cage during external heart massage, which is electrically connected to the reanimation state simulation and control system and comprises: a breast bone fracture simulation transducer having a switching element installed at the end of a resilient plate whose other end is secured under a resiliently deformable petal-shaped cut in the front rigid panel of the rib cage unit in the area of manubrium sternum; rib fracture simulation transducers installed one opposite the other beneath the petal-shaped cuts in the front rigid panel of the rib cage unit in the area of lateral rib ends; a multiple rib cage fracture simulation transducer having a permanent magnet installed on the middle rigid panel of the rib cage unit, a ferreed contact being installed under said permanent magnet on the rear rigid panel of the same unit so that they operatively interact when overloaded.

This makes it possible to practice external heart massage in real-life conditions where incorrect position of hands and excessive pressure are often the reason of extremely grave injuries of internal organs in the rib cage of the victim.

It is advisable that the manikin should be equipped with a system simulating injury of internal abdominal organs, which is electrically connected to the reanimation state simulation and control system and comprises a metasternum fracture simulation transducer comprising a switching element installed on the end of a resilient plate whose other end is secured beneath the resiliently compressible petal-shaped cut in the front rigid panel of the rib cage unit in the area of the xiphoid cartilage; a transducer simulating injuries of internal abdominal organs caused by heart compressions administered without inclasping the waist belt, which is made as a model of a belt buckle secured on the external surface of the front rigid panel of the abdomen unit and comprises a housing whose wall is fitted with a ferreed contact and whose base is equipped with a permanent magnet, an insert being adapted for longitudinal motion above said permanent magnet, and another permanent magnet is installed in said insert for operative interaction with a ferreed contact.

This makes it possible to simulate a frequenctly occurring real-life situation when the rescuer should remember to make free the epigastric region of the victim's abdomen from any containing clothing and, when air penetrates into the stomach, remove it by carefully pressing the abdomen.

It is advisable that the manikin should be provided with a stomach decompression simulation system electrically connected to the reanimation state simulation and control system and comprising: a stomach inflation simulator comprising a coil with a core, which is installed on the middle rigid panel of the abdomen unit and above this panel on the rigid front panel of the same unit a metal plate is secured to operatively interact with said coil; a stomach decompression transducer comprising said permanent magnet installed on the middle rigid panel of the abdomen unit and a ferreed contact installed on the rear rigid panel of the same unit under the permanent magnet for operative interaction therewith during stomach decompression; a detector of the manikin position in relation to the horizontal plane, which comprises a frame made as an isosceles triangle whose base is secured by means of a metal plate on the rear rigid panel of the abdomen unit, ferreed contacts being installed in the walls of the frame symmetrically one opposite another and a permanent magnet being suspended between said ferreed contacts directly above the metal plate for operative interaction with said ferreed contacts; the metal plate functions as a damper for the swinging permanent magnet.

This makes it possible for trainees to learn, in most realistic conditions, one of the vital life saving technique of removing air from the stomach. When air is still in the stomach it prevents the victim's lungs from being inflated and no artificial respiration is possible.

It is advisable that the reanimation state control unit should comprise: an amplifier-converter whose input is connected to the manikin and the output is connected to a unit for determination of reanimation states; a logical circuit connected to the unit for determination of reanimation states and to the output of the amplifier converter; a time interval generator connected to the output of the logical circuit and to the input of a pulse counter connected to the logical circuit and to the input of a switching unit which is also connected to the unit for determination of reanimation states and to a control circuit of simulators.

This makes it possible to ensure two-way and multiple connections between various units of the training device, to compile additional programs of emergency life saving procedures in life-like situations.

BRIEF DESCRIPTION OF THE ACCOMPANYING DRAWINGS

The invention will now be described in greater detail with reference to specific embodiments and to the accompanying drawings wherein:

FIG. 1 illustrates a general view of a training device including a manikin and displays, according to the present invention;

FIG. 2 illustrates a block circuit diagram of a system for simulation and control of reanimation states, according to the invention;

FIG. 3 illustrates the construction of an eye simulator, according to the invention;

FIG. 5 illustrates locations where detectors and transducers are placed on the manikin, according to the invention;

FIG. 7 illustrates a fracture simulation transducer, according to the invention;

FIG. 8 illustrates a detector of the manikin position in relation to the horizontal plane, according to the invention;

FIG. 9 illustrates a transducer simulating injuries of internal organs in the abdominal cavity caused by external heart massage without releasing the belt, according to the invention;

FIG. 11 illustrates the construction of videosimulators of the heart, lungs, stomach, and skeletal frame of the forward surface of the rib cage, according to the invention.

BEST MODE FOR CARRYING OUT THE INVENTION

Figure 4:
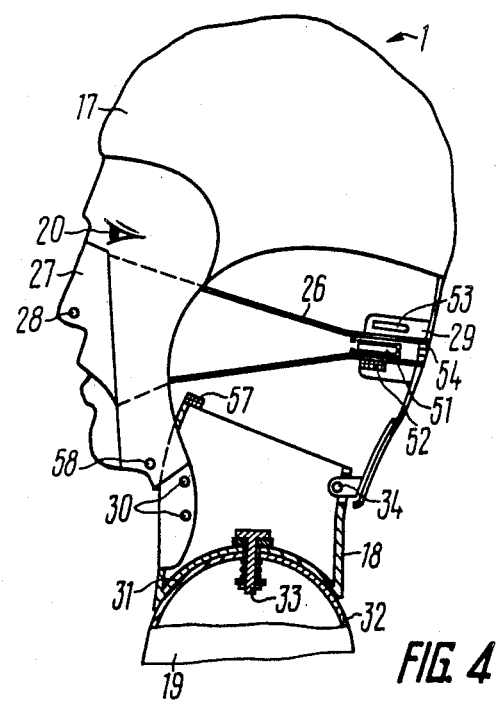
FIG. 4 illustrates a head unit featuring a replaceable funnel and a neck unit, according to the invention.

The training device for practicing emergency life saving techniques comprises a manikin 1 (FIG. 1, FIG. 2) electrically connected to a system 2 for simulation and control of reanimation states. This system 2 comprises: a system of simulators of imitation revivification, which is installed in the manikin 1, a unit 3 of videosimulators of basic vital internal human organs, a unit 4 for control of reanimation states. The videosimulator unit 3 is a display 5 whose housing 6 accommodates the reanimation state control unit 4 and videosimulators of the brain and upper respiratory tracts, a display 7 whose housing 8 accommodates videosimulators of the heart, lungs, stomach, skeletal frame of the rib cage, and locations of injuries. The reanimation state control unit 4 comprises: an amplifier-converter 9 whose input is connected to the manikin 1 (FIG. 1) and whose output is connected to a unit 10 for determination of reanimation states and to the output of the amplifier-converter 9; a time interval generator 12 connected to the output of the logical circuit 11 and to the input of a pulse counter 13 connected to the logical circuit 11 and to the input of a switching unit 14, while an output of the switching unit 14 is connected to the unit 10 for determination of reanimation states, to the manikin 1 and to a simulator control circuit 15. A power supply unit 16 feeds the simulation and control system 2. The manikin 1 (FIG. 1) is anatomically shaped to resemble a human body wherein only those organs are provided which are required for practicing scientifically based and practically tested techniques of heart-and-lung and brain revivification. The manikin 1 is made of modules which are easily detachable, each such module can be an independent training aid.

External anatomical human features of the manikin are available for visual and tactile determination and monitoring.

The manikin 1 is life size but devoid of the upper and lower extremities, and thus comprises a head unit 17, a neck unit 18, and a torso unit 19.

The head unit 17 houses eye simulators 20 each having a shell 21 (FIG. 3) made of acrylic plastic, whose visible part is a lens simulating an eye ball and an iris. The shell 21 contains, installed one under another, a light filter 22 simulating a dilated iris, a light guide 23 with a small cylinder 24 installed inside said light guide 23 and made of a non-transparent material to simulate a contracted iris, and a filament lamp 25 connected to the simulator control circuit 15 (FIG. 2).

This design of the eye simulator 20 (FIG. 3) makes it possible to imitate changes in geometrical dimensions of pupils from 2 mm to 6 mm adequately respresenting the state of the victim. This can be used to diagnose and monitor of the efficiency of heart-and-lung and brain reanimation by the size of the pupils because in practical conditions contraction of the pupils is an indication of restoration of brain functions.

A funnel 26 is installed in the head unit 17 (FIG. 4) of the manikin 1. The funnel 17 is replaceable and its wide base is a face mask 27. The internal space of the funnel 26 communicates with openings 28 provided in the area of nostril wings and mouth, thus forming the nasal-oral cavity. The narrow potion of the funnel 26 gradually transforms into a hollow cylinder by which the nasal-oral cavity is associated with the atmosphere. A through opening is provided in the back of the head unit 17 and a support tube 29 is installed opposite this through opening inside the head unit 17. The internal diameter of this tube 29 corresponds to the diameter of the cylinder of the funnel 26.

The neck unit 18 is a hollow cylinder whose external surface matches the shape of a human neck, having imitation muscles, the laryngeal prominence and larynx. Through openings 30 are made in the cylinder wall in the area of the corotid arteries, the upper cylinder base of the neck unit 18 being located in the head unit 17, while the lower base is a concave hemisphere 31 in which a through oval opening is provided.

The torso unit 19 (FIG. 1) is made hollow. The upper part of the torso unit 19 ends with a convex hemisphere 32 featuring an opening whose curvature conforms with the curvature of the concave hemisphere 31 of the lower base of the neck unit 18 with which it is mated so that it can slide therein. The two hemispheres are connected by a spring-loaded bolt 33. The upper base of the neck unit 18 (FIGS. 1 and 4) is freely placed in the head unit 17, the edge thereof being used to install one part of a hinge 34 whose other part is installed in the back of the head unit 17. This hinge 34 connects the head unit 17 with the neck unit 18 so that the lower edge of the back of the head unit 17 is movably secured in one point, the chin area can freely move over the external surface of the cylinder of the neck unit 18. This type of connection of the head unit 17 with the neck unit 18 and of the neck unit 18 with the torso unit 19 permits an anatomically correct modelling of tilting the head back, which is one of the most important and urgent tasks when rendering emergency aid in real life conditions.

The torso unit 19 (FIG. 1) houses a rib cage unit and an abdomen unit. The rib cage unit consists of several hinged rigid panels arranged one under another, namely: a front panel 35, a middle panel 36, and a rear panel 37. The front panel 35 is an imitation external surface of a human rib cage, having some elements of the breast bone, ribs, and xiphoid cartilage. Several petal-shaped cuts 38 (FIG. 5) are made in this front panel 35 in the area of the breast bone, lateral rib ends, and the xiphoid cartilage to provide local resiliently compressible flaps.

Slots are also made in the rear panel 37 (FIG. 1) and replaceable resiliently compressible elements 39 are installed in these slots. These elements 39 are made as rings intended to vary the resistance of the front panel of the rib cage unit to compressions during external cardiac massage.

The abdomen unit also has three hinged rigid panels arranged one under another: a front panel 40, a middle panel 41, and a rear panel 42. The front panel 40 simulates the external surface of the front wall of a human abdomen. Replaceable resiliently deformable elements 43 are placed between the middle panel 41 and the rear panel 42 so that the resistance of the front panel 40 of the abdomen unit to stomach decompressions can be varied. These elements 39 and 43 provide a realistic simulation of the resiliency of the rib cage front wall and of the front wall of the abdomen. The trainee can therefore palpate the abdomen area which is soft to the touch and the rib cage which is hard to the touch quickly find vital reference points for correct positioning of his hands during external heart massage on the surface of the rib cage featuring breast bone elements, ribs, xiphoid cartilage, and jugular fossa. In real life conditions this can help avoid serious injuries of the heart, lungs, and liver during external heart massage.

The imitation anatomical relief of the external surface of the neck unit 18 can help trainees practice feeling the pulse on the carotid artery, which is the most reliable indication of heart failure and of efficiency of external massage. The manikin 1 is equipped with a system of simulators of real life revivification, which is electrically connected to the unit 4 (FIG. 2) for control of reanimation states, comprising the above eye simulators 20 installed in the head unit 17 and simulators 44 of spontaneous pulse, and a simulator of spontaneous respiratory motions of the rib cage.

Figure 6:
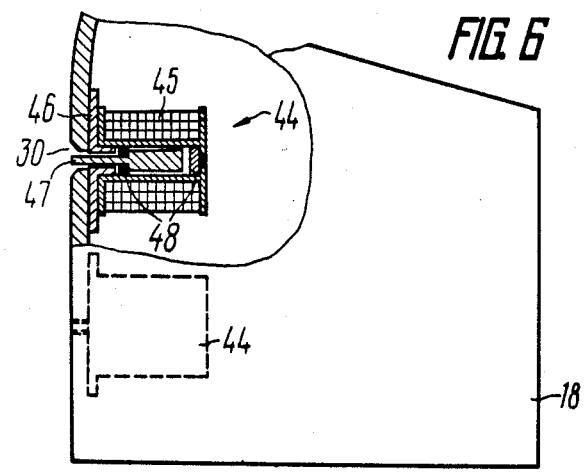
FIG. 6 illustrates a simulator of pulse in carotid arteries, according to the invention.

The spontaneous pulse simulators 44 are installed in the neck unit 18 in the area of the carotid arteries two simulators for each artery. Each spontaneous pulse simulator 44 (FIG. 6) comprises a coil 45 placed inside a cylinder of the neck unit 18 so that the hole in the coil 45 and the through opening 30 in the wall of the cylinder of the neck unit 18 have a common geometrical axis. A core 46 having a through opening is pressed in inside the coil 45, while another core 47 is arranged inside said coil 45 so that it can move longitudinally therein. The wide part of the core 47 corresponds to the internal diameter of the coil 45, while the narrow part thereof corresponds to the diameter of the through opening 30 provided in the wall of the cylinder of the neck unit 18 and to the diameter of the opening in the core 46. Resilient gaskets 48 are provided on the butt ends of the core 47. The coil 45 is electrically connected to the simulator control circuit 15 (FIG. 2) connected to the videosimulator unit 3.

This design of the pulse simulator makes it possible to simulate typical irregularities of pulse beats by varying the frequency of current pulses supplied to the winding of the coil 45 (FIG. 6) in conformity with the state of the victim and to teach each trainee how to determine the presence or absence of spontaneous pulse prior to external cardiac massage.

The simulator of spontaneous respiratory motions of the rib cage comprises a coil 49 (FIG. 1) with a core, which is installed on the middle rigid panel 36 of the rib cage unit and is electrically connected to the simulator control unit 15 (FIG. 2). A metal plate 50 is arranged above the coil 49 on the internal surface of the front panel 35 (FIG. 1) for operative interaction with the electromagnetic field of said coil 49.

The electromagnetic method of simulation of respiratory motions of the rib cage in the manikin of the training device claimed herein makes it possible, in contrast to all other prior art training aids, to eliminate all elastic bags to which insufflated air is supplied, thus making them potential infection foci. It also makes it possible to simulate different types of respiration of the victim, including, for example, a very frequent type of terminal states—agonal breathing. The trainee can also learn to determine the presence or absence of spontaneous respiration.

These components of the system simulating a real-life revivification, which are installed in the manikin, make it possible for trainees to check their actions by automatically represented indications of revivification, such as contraction of eye pupils, the rise and fall of the front panel of the rib cage, pulse beats in the carotid arteries. In this way the gradual revivification process is most realistically simulated as a result of correctly applied emergency life saving techniques.

To monitor basic reanimation indications during the training process and to realize the revivification effect, the manikin 1 (FIG. 1) is equipped with an artificial respiration transducer and an external heart massage transducer.

The artificial respiration transducer comprises a metal sleeve 51 (FIG. 4) with a calibrated opening provided in the bottom thereof. This sleeve 51 is installed for longitudinal movement in the cylinder of the replaceable funnel 26. The artificial respiration transducer also comprises a permanent magnet 52 operatively interacting with a ferreed contact 53, which are located one opposite the other on the wall of the support tube 29 in the back of the head unit 17. A lock washer 54 is installed at the outlet of the replaceable funnel 26 to prevent the metal sleeve 51 from falling out. The calibrated opening provided in the bottom of the metal sleeve 51 is intended to vary the resistance of the respiratory tracts, lungs, and the rib cage to the insufflated air with a given volume. The ferreed contact 53 is electrically connected to the control unit 4 (FIG. 2).

The external heart massage transducer comprises a permanent magnet 55 (FIG. 1) installed on the internal surface of the middle rigid panel 36 of the rib cage unit, and a ferreed contact 56 installed under said permanent magnet 55 of the rear rigid panel 37 of the rib cage unit for operative interaction therewith during external cardiac massage. This ferreed contact 56 is electrically connected to the control unit 4 (FIG. 2).

To check if the victim is properly prepared for life saving procedures, the minikin 1 (FIG. 1) is equipped with a head position detector comprising a permanent magnet 57 (FIG. 1,4) installed on the upper base of the cylinder of the neck unit 18 and a ferreed contact 58 installed on the internal surface of the head unit 17 in the chin area for operative interaction therewith. This ferreed contact 58 is electrically connected to the control unit 4.

For practicing correct cardiac massage techniques without inflicting injuries to the victim, the training device is equipped with a system simulating injuries of the skeletal frame of the rib cage during external heart massage, which is electrically connected to the reanimation state simulation and control system 2 and comprises: an imitation breast bone fracture detector, an imitation rib fracture detector, and an imitation multiple rib cage fracture detector.

The imitation breast bone fracture detector and imitation rib fracture detectors are made as a switching element (FIG. 7) installed on the end of a resilient plate 60 whose other end is secured under a respective resiliently compressible petal-shaped cut 38 made in the front rigid panel 35 of the rib cage unit in the area of the manubrium sterni and the areas of the lateral rib endings.

The imitation multiple rib cage fracture detector is made as a permanent magnet 61 (FIG. 1) installed on the internal surface of the middle rigid panel 36 of the rib cage unit and a ferreed contact 62 installed under said permanent magnet 61 on the rear rigid panel 37 of the same rib cage unit for operative interaction with said permanent magnet 61.

The training device proposed in this description makes it possible to practice a very important procedure of removing air from the victim's stomach. In practice, if air is still in the stomach, the lungs of the victim cannot be fully inflated and artificial lung ventilation becomes impossible. It may also provoke a very serious complication—regurgitation of the stomach content, which can result in obstruction of the upper respiratory tracts. The proposed training device can simulate two reasons of air penetration into the stomach. The first has already been described—artificial ventilation of lungs without tilting back the head of the manikin 1 (FIG. 1). The second reason is excessive insufflation of lungs.

The stomach decompression procedure is realized by a system simulating stomach decompression, which is electrically connected to the reanimation state simulation and control system 2 (FIG. 2) and compresses: a stomach inflation simulator, a stomach decompression detector, a detector of the manikin position in relation to the horizontal plane.

The stomach inflation simulator is made as an electromagnet having a coil 63 (FIG. 1) with a core, which is installed on the middle panel 41 of the abdomen unit and a metal plate 64 secured above the coil 63 on the internal surface of the middle panel 40 for operative interaction with the electromagnetic field of this coil 63.

The stomach decompression detector is made as a permanent magnet 65 secured on a bracket 66 installed on the internal surface of the middle rigid panel 41 of the abdomen unit, while a bracket 67 is installed on the rear rigid panel 42 under said permanent magnet 65 and carries a ferreed contact 68 operatively interacting with the permanent magnet 65.

A detector 69 (FIG. 1) of the position of the manikin 1 in relation to the horizontal plane is a frame 70 (FIG.

8) in the form of an isosceles triangle whose base is secured by a metal plate 71 on the rear rigid panel 42 of the abdomen unit, ferreed contacts 72 and 73 being installed in the walls of the frame 70 symmetrically one opposite the other. A permanent magnet 74 is suspended directly over the metal plate 71 (FIG. 8) for operative interaction with said ferreed contacts 72 and 73. The metal plate 71 is in this case a damper for the swinging permanent magnet 74.

The proposed training device is provided with a system simulating injuries of internal abdominal organs. This system makes it possible for trainees to acquire a stable skill of releasing the epigastric area of the victim's abdomen from compression by a waist belt, worker's safety belt (or some other constraining outfit), and, also, not to apply pressure in the area of the metasternum or excessive pressure during decompression of the stomach or during massage. This is an extremely important aspect of training because in real life situations neglecting these rules may lead to regurgitation, aspiration, or liver rupture.

The system simulating injuries of internal abdominal organs is electrically connected to the reanimation state simulation and control system 2 (FIG. 2) and comprises a simulated breast bone and rib fracture detector 75 (FIG. 1) which is the switching element 59 installed at the end of the resilient plate 60 whose other end is secured under the resiliently compressible petal-like cut 38 provided in the front rigid panel 35 of the rib cage unit in the area of the xiphoid cartilage.

The detector of simulated injuries of internal abdominal organs from heart compressions with the waist belt left locked is made as a model 76 (FIG. 1) of a belt clasp secured on the external side of the front rigid panel 40 of the abdomen unit and comprises a housing 77 (FIG. 9) with a ferreed contact 78 installed in the wall thereof. A permanent magnet 79 (FIG. 9) is mounted in the base of the housing 77 together with an insert 80 adapted for logitudinal motion and carrying another permanent magnet 81 operatively interacting with the ferreed contact 78 and with the permanent magnet 79 with which it forms a magnetic spring. The insert 79 is held in the housing 77 by means of a cover 82.

An excessive decompression detector comprises the above described permanent magnet 65 (FIG. 1) installed on the bracket 66 secured on the internal surface of the middle rigid panel 41 of the abdomen unit and operatively interacting with a ferreed contact 83 mounted on said bracket 67 secured on the rear rigid panel 42 of the same unit.

In contrast to known training manikins, the proposed training device is equipped with a system of videosimulators imitating basic vital internal human organs which change their state in conformity with the manipulations of the trainee on the manikin 1 (FIG. 1). This type of information on the progress of training ensures that pathological physiology of victim's terminal states is made available to all categories of trainees without exception and thus speed up the training process, make it more efficient, and make skills and knowledge acquired by this method more stable and profound.

The videosimulator unit 3 (FIG. 2) of internal human organs comprises: a brain and upper respiratory tract videosimulator; a heart videosimulator; a lung videosimulator; a stomach videosimulator, a videosimulator of the skeletal frame of the rib cage and of local injuries.

The brain video simulator makes it possible to isolate one of the most important aspects of emergency life saving operations—protection of the brain. The trainee checks his actions against the brain oxygenation, when his manipulations are correct the videosimulator demonstrates a pulse blood flow in the carotid artery and gradual change of color, from white to pink, of the brain "tissue".

The video simulator of upper respiratory tracts makes it possible to teach how to notice an important prognostic indication of revivification beginning—restoration of relexes of the upper respiratory tracts. It also permits control of the state of the upper respiratory tracts and prevention of their obstruction by properly handling the manikin.

The video simulator of the rib cage frame and local injuries makes it possible to teach trainees correct positioning of hands during heart massage. It can also help trainees to learn to control the amount of air blown in during artificial respiration and the force applied to the victim's chest during external heart massage, which is vital if life saving procedures take a long time.

The video simulator of brain and upper respiratory tracts is installed in the housing 6 (FIG. 1) of the display 5 and is made as a plate 84 (FIG. 10) carrying: an outline 85 of a lengthwise cross-section of the head, in which filament lamps 86, 87, 88, 89, 90, and 91 are arranged and connected to the switching unit 14 (FIG. 2) of the reanimation state simulation and control system 2; an outline 92 (FIG. 10) of a brain hemisphere; an outline 93 of the nasal-oral cavity; and light guides: a light guide 94 with filament lamps 95 simulating a carotid artery, a light guide 96 with a filament lamp 97 simulating the esophagus; a light guide 98 with a filament lamp 99 simulating the windpipe. The filament lamps 95, 97, and 99 are connected to the simulator control circuit 15 (FIG. 2).

A digital time indicator 100 is installed in the upper corner of the plate 84. All filament lamps 86, 87, 88, 89, 90, 91, 95, 97, 99 and the digital time indicator 100 are electrically connected to the switching unit 14 (FIG. 2) of the simulation and control unit 2.

The face of the outline 85 (FIG. 10) of the head cross-section is covered by a panel 101 made of a light-diffusing material and shaped to conform with the outline. The plate 84 is placed in the housing 6 with the following elements fitting in a slot 102 in front of said plate one after another: a semitransparent panel 103; a slide 104 with color images of cerebral hemispheres, carotid arteries, and he nasal-oral cavity with the esophagus and windpipe; a screen 105 made of a semitransparent material with a transparent window left in the right-hand corner for a better view of the digital time indicator 100.

The housing 6 also accommodates the power supply unit 16, the lateral walls thereof carrying an electrical connector to plug in the supply cable and a connector 106 (FIG. 10) to plug in a cable connecting the display 5 (FIG. 1) to the display 7.

The display 7 comprises, similar to the display 5, video simulators of the heart, lungs, stomach, and skeletal frame of the rib cage, these simulators being electrically connected to the reanimation state simulation and control system 2 (FIG. 2). These video simulators are designed as a rigid panel 107 (FIG. 11) carrying an outline 108 simulating human lungs when collapsed; an outline 109 simulating human lungs inflated to a volume of 1000–1500 ml; an outline 110 simulating lungs inflated to a volume in excess of 2000 ml; an outline 111 simulating a contracted human heart (systole); an outline 112 simulating a relaxed human heart (diastole); an outline 113 simulating a human stomach filled with air. Filament lamps 114 and 115 are installed in the outline 108, filament lamps 116 and 117 in the outline 109, filament lamps 118 and 119 in the outline 110, a filament lamp 120 in the outline 111, a filament lamp 121 in the outline 112, and a filament lamp 122 in the outline 113.

Additionally, a filament lamp 123 is placed in the spot corresponding to the loaction of the manubrium sternum on the panel 107, a filament lamp 124 and a filament lamp 125 are placed in locations corresponding to the lateral rib endings, and a lamp 126 in placed in the spot corresponding to the xiphoid cartilage.

A lighting lamp 127 is placed below the outline 113 simulating a human stomach in the area of the belt clasp. These lamps installed on the panel 107 are electrically connected to the simulator control circuit 15 (FIG. 2). The face of the outlines 108 (FIG. 10), 109, 110, 111, 112, and 113 is covered by a panel 128 made of a light-sensitive material. And, placed in front of the outlines one after another in a slot 129, are: a panel 130 made of a semi-transparent material with an image 131 of a human torso, an image 132 of the front part of the rib cage skeleton, and an image 133 of the belt clasp; a film slide 134 with a color varying-contrast image of the human heart, lungs and stomach; a screen 135 made of a semi-transparent material. A printed circuit board 136 is also installed in the housing 7, components of the reanimation state control unit 4 (FIG. 2) being arranged thereon. A panel is installed above the printed circuit board 136 and carries: switching elements connected to the switching unit 14; a "ready" push button 137 to set the training device ready for the practicing session; a "pulse" push button 138 to switch on the simulator of eyes and pulse; a "breathing" push button 139 to switch on the simulator of breathing motions of the rib cage; a "1:5/2:15" push button 140 to select the ratio inhale++compression 1:5 or 2:15; an "agony" push button 141 to switch on a respective operational mode of the simulators.

The above described detectors, transducers, simulators, and video simulators installed in the manikin 1 (FIG. 1) and in the displays 5 and 7 are electrically connected to the reanimation state simulation and control system 2 (FIG. 2) to form two-way and multiple connections which permit highly realistic simulation of situations of specific accidents occuring in real life.

The herein proposed training device permits practicing:

diagnostic procedures of terminal states as referred to the condition of the heart, breathing, and cerebral blood circulation, which are based on measurements of:
  (a) pulse in carotid arteries;
  (b) geometrical size of eye pupils;
  (c) positions of the front wall of the rib cage, corresponding to normal breathing, agonal breathing, absence of breathing;
  (d) state of the heart, lungs, upper respiratory tracts, and brain as shown on the display screens;
techniques of freeing the passages of the upper respiratory tracts;
technique of adequate lung ventilation by "mouth-to-mouth", "mouth-to-nose", and "mouth-to-adaptor" resuscitation;
technique of removing the air from the stomach by the method of brief compressions of the stomach area by hand;
technique of artificial blood circulation by external heart massage.

The training device for practicing emergency life saving techniques operates as follows.

The manikin 1 (FIG. 1) is placed on an even hard surface, the displays 5 and 7 are placed or suspended nearby where they can be easily seen, One electric cable is used to connect the display 5 to the display 7, and the other the display 7 to the manikin 1. When the display 5 is connected to power the digital indicator 100 shows "00". This means the training device is energized and ready for operation.

Terminal states are diagnosed on the training manikin as follows: by the presence of pulse on the carotid arteries of the manikin 1 (FIG. 1) considering that the absence of pulse on large arteries is a vital indication of cardiac arrest; by the size of the eye pupils, considering that restoration of eye reflexes is a positive diagnostic indication; by the visible breathing and by the state of main internal organs simulated on the displays 5 and 7.

Pulse is felt on the manikin 1 as follows. The index and middle fingers are placed on the Adam's apple of the neck unit 18, then moved back towards nodding muscles with slight pressure being applied.

The training device can simulate three states: clinical death, agony, living organism.

Figure 10:
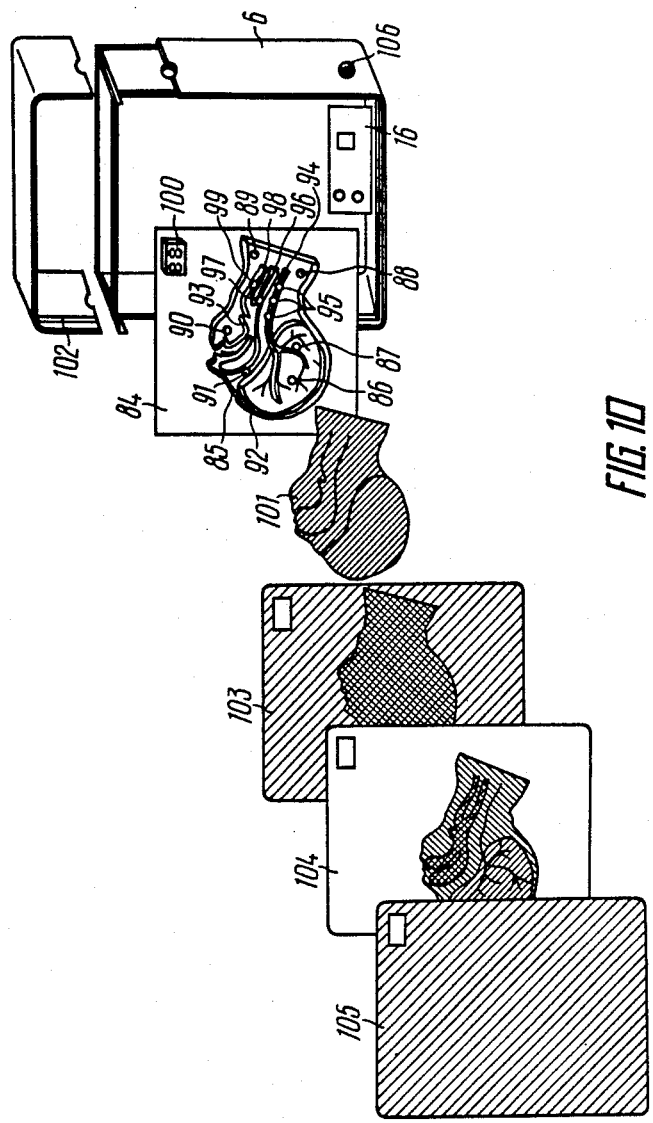
FIG. 10 illustrates the structure of videosimulators of the brain and upper respiratory tracts, according to the invention.

To simulate clinical death, the button "ready" 137 should be pressed. By this the following circuits are connected in the switching unit 14 (FIG. 2) and the simulator control unit 15: circuits of the lamps 114, 115 (FIG. 11) in the outline 108 simulating collapsed lungs the lamp 121 in the outline 112 simulating the heart diastole, and the lamp 126 illumination the picture 133 of the belt clasp. Also lighted are lamps 86, 87, 88, 89, 90, and 91 (FIG. 10). The trainee can see on the display 7 (FIG. 1) collapsed lungs, relaxed heart, a picture of the belt clasp (indicating that the belt is still tightened around the victim's waist); and on the display 5—the picture of a greyish color brain hemisphere and obstructed upper respiratory tracts. The manikin 1 displays no indications of life—eye pupils are dilated, no pulse is present in the carotid arteries, and no breathing can be externally observed.

When the "agony" button 141 (FIG. 1) is pressed, the unit 10 (FIG. 2) for determination of reanimation states produces current pulses with a frequency of 1 Hz and variable amplitude and frequency pulses which are supplied to the switching unit 14 (FIG. 2), the simulator control unit 15, and the video simulator unit 3.

These signals are supplied from the switching unit 14 to the coil 49 (FIG. 1) of the simulator of spontaneous breathing motions of the rib cage; to the coil 45 (FIG. 6) of the simulator 44 of spontaneous pulse; to the lamps 114, 115, 116, and 117 (FIG. 11) of the outline 108 of collapsed lungs and the outline 109 of normally inflated lungs, and, also, to the lamps 120, 121 of the outlines 11 and 112 simulating respectively the systole and diastole of the heart. The filament lamps turned on by the "ready" button 137 on the display 5 are left on. As a result, the trainee looking at the manikin 1 can see; dilated eye pupils, spasmotic varying-rate excursions of the front panel 35 of the rib cage unit; can feel in the carotid arteries pulse beats; and can see on the display 7 contracting heart, incompletely inflating lungs with a breathing rate of 8 and less inhalations per minute; and on the display 5—the picture of greyish color brain.

To simulate the living state, the "pulse" button 138 and "breathing" button 139 should be pressed, and the unit 10 (FIG. 2) for determination of reanimation states produces current pulses with a frequency of 1 Hz and 0.25 Hz, which are supplied to the switching unit 14, the simulator control unit 15, the video simulator unit 3, and the manikin 1 in order to form revivification simulating circuits as follows:

eye simulator 20 (FIG. 1): lamp 25 (FIG. 3) is illuminated, the light filter 22 located in front of the light guide 23 is decolorized and the non-transparent cylinder 24 simulating a contracted pupil can be seen on the eye ball of the shell 21:

spontaneous pulse simulator 44 (FIG. 1): current pulses with a frequency of 1 Hz (60 per minute) are applied to the coil 45 (FIG. 6) and the core 47 moves in the coil 45 at the same rate;

simulator of spontaneous respiratory motions of the rib cage: current pulses with a frequency of 0.25 Hz (corresponding to the rate of 15 pulses per minute) are applied to the coil 49 (FIG. 1). The plate 50 secured on the front panel 35 of the rib cage unit is drawn to the core of the coil 49 at the same rate;

heart video simulator: current pulses with a frequency of 1 Hz are applied to the filament lamps 120 and 121 (FIG. 11) and illuminate, respectively and in succession, the outlines 111 and 112 providing an illusion of a contracting heart;

lung video simulator: current pulses with a frequency of 0.25 Hz are applied successively to the filament lamps 114, 115, 116, and 117 illuminating the outlines 108 and 109 producing an illusion of expanding lungs;

video simulator of the brain and upper respiratory tracts: a train of time-shifted pulses with a frequency of 1 Hz is applied to the lamps 95 (FIG. 10), while a constant-amplitude voltage is supplied to the lamp 99. The visible results are:

on the manikin 1 (FIG. 1): contracted eye pupils can be seen, pulse on the carotid artery can be felt, respiratory excursions of the front wall of the rib cage can be seen;

on the display 7: normally expanding lungs and normally contracting heart can be seen;

on the display 5: a pulsating artery can be seen, the brain tissue turns pink.

Having determined the symptoms and the state of the victim, the trainee begins emergency life saving procedures.

The obligatory stage is releasing the victim from the constraining clothing and particularly from the workers's outfit which can limit the front abdominal wall, such as the waist belt, safety belt, or corset.

It is necessary therefore to simulate, prior to the beginning of resuscitation, unclasping the buckle of the waist belt on the manikin 1 (FIG. 1). To this end, the insert 80 (FIG. 9) is to be shifted to the right as far as it will go, the detector 76 (FIG. 1) of simulated injuries of internal organs of the abdominal cavity is triggered into operation since the permanent magnet 81 (FIG. 9) is brought close to the ferreed contact 78. The signal produced by the detector 76 is delivered to the amplifier-converter 9 (FIG. 2) where a signal for the logical circuit 11 and for the unit 10 for determination of reanimation states is generated and is further supplied to the switching unit 14, the simulator control unit 15, and to the video simulator unit 3.

In the switching unit 14 the electrical circuit of the lamp 127 (FIG. 11) illuminating the image 133 of the belt clasp is blocked, the external heart massage detector is disconnected from the detector of simulated xiphoid cartilage fracture, while the logical circuit 11 (FIG. 2) activates the time interval generator 12 which enables pulses to be applied to the counter 13 and, via the switching unit 14, to the digital time indicator 100 connected to the simulator control circuit 15. In consequence, the image of the belt clasp is removed from the display 7 (FIG. 1) and the digital indicator 100 starts counting reanimation time on the display 5.

The next stage of the life saving procedure is restoration of the passage of the upper respiratory tracts. To this end, the head of the manikin should be tilted as far back as possible. The trainee should place one hand under the neck or place a roll under the shoulder blades of the manikin and press the forehead by the other hand.

In real life situations loss of consciousness results in hypopharyngeal obstruction, the tongue root bears against the back wall of the throat. This type of obstruction is most frequently the reason of asphyxia. This is why tilting back the victim's head is an important stage in the life saving procedure.

When the head of the manikin 1 (FIG. 1) is tilted back, the chin area of the head unit 17 slides over the surface of the neck unit 18 and shifts up in relation to the rear surface of the neck unit 18. The ferreed contact 58 (FIG. 4) is brought closer to the permanent magnet 57 actuating the detector of the manikin head position. The signal of the head position detector is supplied to the amplifier-converter 9 (FIG. 2) to produce a signal for the logical circuit 11 which actuates the unit 10 for determination of reanimation states, which controls the switching unit 14 and the simulator control circuit 15 from which the signal is applied to turn on the lamp 99 (FIG. 10) installed in the video simulator of the upper respiratory tracts in the light guide 98 simulating the windpipe.

Simultaneously, in the switching unit 14 (FIG. 2), the ferreed contacts 53 (FIG. 4) of the artificial respiration detector are connected to the coil 49 (FIG. 1) of the electromagnet of the simulator of respiratory motions of the rib cage. A picture of an unconstricted windpipe is shown on the display 5 and the electrical circuit of the simulator of respiratory motions of the manikin rib cage is ready for operation. After the belt is released and the victim's head is tilted back, the trainee begins lung ventilation. Lungs can be ventilated by one of the three methods: mouth-to-mouth, mouth-to-nose, and mouth-mask-nose using artificial respiration apparatuses, by insufflation of air or oxygen. When "mouth-to-mouth" resuscitation is to be practiced, the trainee pinches the openings 28 (FIG. 1) in the area of nostrils by his index finger and thumb, inhales deeply, and pressing his lips tightly to the halfopened mouth of the manikin 1 makes an energetic exhalation. The air breathed in penetrates into the replaceable funnel 26 (FIG. 4), shifts the metal sleeve 51 and leaves through the opening in the lock washer 54 outside. The artificial respiration detector operates because the field of the permanent magnet 52 closes the ferreed contacts 53. The signal of the artificial respiration detector is supplied to the amplifier-converter 9 (FIG. 2) producing a signal for the logical circuit 11.

The output signal of the logical circuit 11 is supplied to the unit 10 for determination of reanimation states and to the time interval generator 12.

The output signal of the unit 10 for determination of reanimation states is supplied to the switching unit 14 and to the simulator control circuit 15.

This results in the following: the time interval generator 12 is triggered into operation and enables the passage of pulses to the pulse counter 13. Depending on the duration of the period of air insufflation to the nasal-oral cavity of the manikin 1, when the ferreed contacts 53 remain closed, lamps 116, 117 (FIG. 10) or 118 and 119 are turned on in the outline 109 corresponding to normally inflated lungs and in the outline 110 corresponding to overinflalted lungs. Simulataneously, a current pulse is delivered to the coil 49 (FIG. 1) of the electromagnet of the simulator of respiratory motions of the rib cage.

The trainee can visually monitor the effect of insufflation by the rise of the front panel 35 of the manikin rib cage because the plate 50 is drawn by the electromagnetic field to the core of the coil 49.

At the same time, the display 7 shows a picture of normally inflated or overinflated lungs, depending on the amount of blown-in air. When insufflation of air into the oral-nasal cavity of the manikin 1 is discontinued, the metal sleeve 51 (FIG. 4) is brought back to the original position by the force of the permanent magnet 52, the artificial respiration detector returns to the initial state when the contacts 53 are open, the front panel 35 (FIG. 1) sinks under its own weight simulating a passive exhalation, and the display 7 shows a picture of deflated lungs.

It can be concluded that the time during which the contacts of the artificial respiration detector stay closed is the function of the time the air at a specific pressure passes through the passage, this pressure being set by means of the calibrated opening in the bottom of the metal sleeve 51 (FIG. 4). This air pressure is selected to be in conformity with the resilient resistance of the lungs, the rib cage and airways of the victim to the air blown in. The make time of the ferreed contacts 53 of the artificial respiration detector serves to determine the volume of the blown-in air. In the final analysis, the volume of the air blown in at a specific pressure is the function of the duration of the output pulse of the ferreed contacts 53 of the artificial respiration detector.

In case the trainee blows air into the mouth cavity of the manikin 1 (FIG. 1) too long, the front panel 35 stays up for a longer time too, and the display 7 shows a picture of overinflated lungs (with an air volume of 2000 ml and more). Registering of excessive air volume blown into the victim's lungs is an important teaching aspect because in real life situations there is a danger of lung rupture, while the trainee may develop hypoxia. When the amount of blown-in air is insufficient, or it leaks through incompletely pinched off nostrils, the artificial respiration detector is not actuated, the front panel 35 of the rib cage stays immobile, and the display 7 shows deflated lungs.

When "mouth-to-nose" resuscitation is practiced on the manikin 1 (FIG. 1), the air is blown into the oral-nasal cavity through the openings 28 in the area of nostrils, while the mouth opening should be closed off. All other operations are similar to the procedure described above. The same techniques are employed during artificial lung ventilation by the "mouth-mask-nose" method.

The most frequent mistake during artificial lung ventilation is incomplete tilting back of the victim's head. If this mistake is made on the manikin 1 (FIG. 1), the head position detector is not actuated and the ferreed contacts 53 (FIG. 4) of the artificial respiration detector remain connected to the coil 63 (FIG. 1) of the electromagnet of the full stomach simulator. In addition, lamp 122 (FIG. 11) installed in the outline 113 simulating the stomach filled with air and lamps 114 and 115 installed in the outline 108 simulating deflated lungs are connected in the switching unit 14. When air is blown into the oral-nasal cavity of the manikin 1 (FIG. 1) with its head incompletely tilted back, the front panel 40 of the abdomen unit rises since the plate 64 is drawn to the core of the coil 63 and fixed in that position. The displays 5 and 7 (FIG. 1) show pictures of the upper respiratory tracts obstructed by the tongue, lungs filled with air, and deflated lungs. When excessive air is blown into the lungs of the manikin (over 2000 ml), the training device also registers air in the stomach and its inflation.

In this case, the trainee can see on the manikin 1 (FIG. 1) and on the display 7 the situation similar to that when the head of the manikin is not fully tilted back. The trainee has to proceed by applying the technique of releasing air from the victim's stomach, turn the manikin 1 on its side and briefly press the stomach area between the breast bone and the belly button. The front panel 40 of the abdomen unit is in this case pressed on the middle panel 41 overcoming the resistance of the resiliently compressible elements 43 and coming closer to the rear panel 42. This results in the following: the detector 69 of the manikin position in relation to the horizontal plane operates because the permanent magnet 74 (FIG. 8) is brought closer to one of the ferreed contacts 72 or 73 depending on what side the manikin is turned on. The stomach decompression detector operates because the permanent magnet 65 (FIG. 1) is brought closer to the ferreed contact 68. When these detectors are actuated, the above described connections result in production of control signals disconnecting the circuits of the full stomach simulator and the illuminating lamp 122 (FIG. 11) in the simulator control circuit 15 (FIG. 2). The front panel 40 of the abdomen unit returns to its initial position in the manikin 1 (FIG. 1) and the picture of air-filled stomach disappears from the display 7. If the trainee, at this point, corrects his mistake and tilts back the manikin head, the display 5 shows an opened passage of the windpipe, and the artificial lung ventilation can be continued as usual.

When the procedure of releasing air from the victim's stomach is performed incorrectly (the manikin is not turned on its side, the pressure is misplaced, or the time runs out), all above mentioned circuits are not connected, the manikin 1 and display 7 demonstrate that air is still in the stomach and further life saving procedures are useless.

In this manner, the trainee checks the efficiency of artificial lung ventilation, as in real life situations, by the rise of the front wall of the rib cage and of the front abdominal wall, by the air leaking from the nostrils, and by the adequate changes in the volume of lungs when air is blown thereto, by air penetration into the stomach, and by the pictures of the upper respiratory tracts shown on the displays 5 and 7 (FIG. 1).

External heart massage and artificial respiration can be performed to sustain assisted blood circulation by two persons simultaneously. The procedure provides for making continuous compressions on the lower third of the breast bone area at a rate of one compression per second, that is 60 compressions per minute. One lung insufflation is performed for each 5 breast bone compressions. The position of hands of the trainee can be corrected by the existing anatomical indications simulated on the external surface of the rib cage and abdomen. The manikin features distinctly palpable elements of the breast bone, ribs, jugular fossa and, xiphoid cartilage. The trainee makes a mental division of the distance from the jugular fossa to the xiphoid cartilage into 3 equal portions and places his hands on the lower third, presses vertically down and brings the front panel 35 of the rib cage unit some 3-4 cm down. These compressions are actually to be abrupt thrusts.

The trainee has to overcome the resistance of the resiliently compressible elements 39 whose number is selected so that the resistance of the manikin rib cage is equal to 13-34 kg (22.9 kg on the average) when compressed to a distance of 4 cm. This compression force for manikins was recommended by the International conference on emergency aid at the accident site in Oslo in May 20-23, 1979.

When the position of hands and the compression force applied by the trainee are correct, the panels 35 and 36 of the rib cage unit are shifted downward compressing the resiliently deformable elements 39 for some 3-4 cm. The external heart massage detector is actuated because the permanent magnet 55 is brought close to the sealed-contact reed relay 56.

The output signal of the external heart massage detector is supplied to the amplifier-converter 9 (FIG. 2) producing a calibrated voltage pulse for the logical circuit 11 which feeds control signals to the unit 10 for determination of reanimation states and actuates the time interval generator letting pulses pass to the pulse counter 13, the switching unit 14, and the simulator control circuit 15.

The simulator control circuit 15 produces signals which are applied to: the pulse simulator 44 (FIG. 1); the video simulator unit 3 (FIG. 2); the heart video simulator; brain video simulator, and the time digital indicator 100. In consequence, the circuits of said simulators and videosimulators are connected as described above and one trainee can feel the pulse wave in the carotid artery of the manikin 1, the audience can see on the display 7 one cycle of heart contraction and on the display 5 one cycle of blood circulation in the carotid artery and the time count of the training process on the digital indicator 100.

The herein proposed training device makes it possible for trainees to check the efficiency of external heart massage performed on the manikin, as in real life situations, by the presence of the forced pulse wave and by the physiologically realistic picture of contracting heart and blood circulation in the carotid artery shown on displays.

In case the thrust force applied to the manikin chest exceeds 34 kg, and in real life situations the use of excessive force due to the general excitement is extremely dangerous and may lead to serious injuries of internal organs in the rib cage, the resiliently compressible elements 39 (FIG. 1) of the manikin 1 (FIG. 1) are overcompressed and, in addition to the external heart massage detector, the detector of simulated multiple rib cage fractures is actuated by the interaction of the permanent magnet 61 and the sealed-contact reed relay 62.

The output signal of the detector of simulated multiple rib cage fractures produces, as described above, signals in the system 2 (FIG. 2) for simulation and control of reanimation states. The output signal of the unit 10 for determination of reanimation states is supplied to the switching unit 14 and to the simulator control circuit 15, the pulse counter 13 is blocked, lamps 123 (FIG. 11), 124, 125, and 126 in the display 7 (FIG. 1) are illuminated. In consequence, the trainees can see on the screen of the display 7 pulsing light spots in the area of the manubrium sternum, lateral rib endings, and xiphoid cartilage. Any further manipulations, even correct ones, are useless.

A similar situation is observed if the position of the hands during external heart massage is not correct and the trainee is exerting pressure in the area of manubrium sternum, lateral rib endings or the xiphoid cartilage. Since one of the simulated fracture detectors has operated, its output signal is supplied to the system 2 (FIG. 2) for simulation and control of reanimation states, the pulse counter 13 is blocked and current pulses are supplied to one of the lamps 123 (FIG. 11), 124, 125 or 126.

A pulsing spot appears on the picture of the skeletal frame of the rib cage on the display 7 (FIG. 1) in the place where the trainee's hands are positioned on the surface of the rib cage of the manikin 1.

In this manner the herein proposed training device can be used for automatic detection of the following: position of trainee's hands during external heart massage, and the force applied during such massage. A lasting dynamic stereotype of pressing motions can be mastered by trainees who quickly learn to control the force of such compressions and to find the correct place to apply this force.

The herein proposed training device can also be used to practice cardiac-pulmonary reanimation by one person, in which two fast insufflations are followed by 15 compressions of the breast bone. To start operation in this mode the button 140 should be pressed to set all devices of the system 2 (FIG. 2) for simulation and control of reanimation states ready for this type of operation.

Duration of reanimation procedures is automatically recorded in the proposed training device and the time for training is limited so that the trainee learns to make the required manipulations within the time period available, that is to take into consideration one of the vital factors in life saving procedures—the time factor.

When the trainee makes one ventilation or compression, the digital indicator 100 (FIG. 1) of the display 5 starts counting reanimation time equal to 60 seconds. The visual time count from 1 to 60 may also be used to practice the rate of the breast bone compressions during external heart massage, the duration of one correct ventilation, and one correct compression of the breast bone of the manikin 1. The system 2 (FIG. 2) for simulation and control of reanimation states registers one calibrated current pulse. When the trainee makes one ventilation and 5 compressions, from 1 to 5 pulses are registered within the assigned time interval. The positive feedback in the training device, which ensures switching of realistic indications of revivification on the manikin 1 (FIG. 1) and displays 5 and 7, is only realized when the trainee makes a specific number of ventilations and compressions observing the ratio of 1:5 or 2:15, depending on the number of attending persons, the breast bone compression rate being not less than 60 per minute for two persons and 80 per minute for one attending person.

This means that if a trainee performs a minimal number of ventilations and compressions within the given 60 seconds with a ration of 1:5 or 2:15 and observes proper intervals between ventilations, between compressions, between ventilations and compressions, and makes no mistakes mentioned above, the manikin 1 (FIG. 1) displays visible respiratory motions of the front panel 35 of the rib cage, pulse beats on the pulse simulators 44, and contraction of pupils of the eye simulator 20. The digital indicator 100 of the display 5 registers 60 seconds, a picture of a pink brain is shown, as well as blood circulation at a rate of 60 per second in the carotid artery, while the display 7 shows a heart contracting 60 times a minute and lungs inflating 15 times per minute.

Antiseptic treatment of the manikin 1 (FIG. 1) is performed to prevent any cross inflection of trainees when practicing "mouth-to-mouth" or "mouth-to-nose" resuscitation on the proposed training device. It is done as follows.

The manikin 1 is provided with three replaceable funnels 26 (FIG. 4). During a training period, one replaceable funnel 26 is inserted into the head unit 17, while two other funnels are placed into an antiseptic liquid. The funnel 26 is replaced after each trainee completes his excercises, that is the funnel which was in contact with the mouth, breathed-in air and hands of the trainee is placed into the antiseptic liquid, while a new funnel which has been in this liquid for a specific period of time (depending on the solution) is taken out, washed in water, and inserted into the head unit 17 of the manikin 1.

This system of replaceable funnels provides a 100% guarantee against cross infection of trainees because all surfaces of the manikin 1 (FIG. 1) which had been in contact with the breathed-in air, mouth and hands of a trainee are localized in one replaceable funnel 26. It is also important that the manikin has no cavities or spaces to which the air blown in and condensate can penetrate.

The efficiency of training on the herein proposed device can be assessed by the stable skills acquired by trainees in cardiac-pulmonary reanimation procedures laid down in medical instructions and scientific publications.

Such medical instructions list scientifically tested parameters related to volume, frequency, force, and time, which are obligatory to observe during cardiac-pulmonary reanimation. They include:
volume of blown-in air—1000-1500 ml;
pressure of blown-in air—30 mm (water column);
rate of ventilation excursions—12-15 per minute;
inhale/exhale ratio—1/2,3; with the head of the victim being moderately tilted back;
external heart massage—rate: 60 compressions per min with two attendants and 80 compressions per min with one attendant; applied force: 7-11.2 kg in practice, and 13-34 kg on manikins.

Performance criteria of obligatory life saving techniques are incorporated into the training device and are monitored irrespective of an instructor.

The efficiency of artificial respiration on the training manikin is assessed by the visible rise of the front panel 35 of the rib cage unit and by the spontaneous respiratory motions (rise-and-fall of the front panel 35 with a rate of 12-15 inhalation/exhalations per minute). At the same time, the efficiency of artificial respiration can be assessed by the volume and rate parameters shown on the display 7, as well as by the state of the upper respiratory tracts shown on the display 5.

The efficiency of the external heart massage on the manikin 1 is assessed by the appearance of forced pulse motions of the simulators 44 corresponding to the compressions of the breast bone of the manikin 1, spontaneous pulse in the simulators 44 during "revivification" of the manikin, and contraction of pupils of the eye simulators 20 of the manikin 1.

At the same time, the efficiency of external heart massage can be assessed by the rate of the contracting heart on the display 7, changes of the brain color, and beginning of the pulsing blood circulation in the carotid arteries shown the display 5.

To summarize, the herein proposed training manikin is an analog model based on electromagnetic processes, which brings the training process as close to the real life conditions as possible. The new training device ensures a fast and realistic method of practicing life saving techniques for various population contingencies including specific procedures of modern emergency reanimation. It can also make the instructor free of the routine work.

INDUSTRIAL APPLICABILITY

The new training device can be used to train medical personnel, organized groups of industrial workers, including those whose occupation involves professional hazards (power producing plants, transport, oil and gas industry, coal mining, agriculture and others), school children, students, firemen, members of rescue teams, sportsmen, soldiers and officers, and many others.

We claim:
1. A training device for practicing emergency life saving techniques, comprising:
 a mannequin including:
  a head unit with a detachable device for protection of trainees against cross infection, the detachable device comprising a funnel having a base in the form of a face mask providing a nasal-oral cavity, and a narrow portion formed as a hollow cylinder through which said nasal-oral cavity is communicated with the atmosphere;
  a neck unit which is hinged to said head unit;
  a torso unit which is hinged to said neck unit and which includes:
   a rib cage unit, comprising:
    three rigid rib cage panels, namely, a front, a middle, and a rear panel, arranged one above another and hinged together;
    detachable, resiliently compressible rings arranged between said middle and rear panels to imitate the resilience of a human rib cage;
   an abdomen unit, comprising:
    three rigid abdomen panels, namely, a front, a middle, and a rear panel, arranged one above another and hinged together;
    detachable, resiliently compressible rings arranged between said middle and rear panels of the abdomen unit to imitate the resilience of a human abdomen;
 a system for simulation and control of reanimation states, comprising:
  a display enclosed in a housing;
  videosimulators for localized traumas inflicted during the heart massage by wrongly positioned hands of a reanimator, the videosimulators being accommodated within said housing;
  a control time digital indicator accommodated within said housing;
  a unit of videosimulators of vital internal human organs, accommodated within said housing and including:
   a brain videosimulator;

a videosimulator of blood circulation in carotid arteries;
a videosimulator of an upper respiratory tract;
a heart videosimulator;
a lungs videosimulator;
a stomach videosimulator;
a videosimulator of a skeletal frame of a human rib cage;
an artificial respiration detector arranged in said detachable device for protection of trainees against cross infection and in said head unit;
an external heart massage detector accommodated in said rib cage unit;
a mannequin head position detector arranged in said neck and head units;
a system for simulation of injuries of the skeletal frame of the rib cage during external heart massage, arranged in said rib cage unit and including:
a detector of simulated breast bone fracture;
a detectors of simulated rib fractures;
detectors of simulated multiple fractures of the rib cage;
a system for simulation of injuries of internal abdominal organs, accommodated in said abdomen unit and including:
a detector of simulated fracture of xiphoid cartilage;
a detector of simulated injuries of internal abdominal organs due to compressions;
a system for simulating stomach decompression, accommodated in said abdomen unit and including:
a simulator of filling a stomach with water or air;
a stomach decompression detector;
an excessive stomach decompression detector;
a detector of the position of the mannequin in relation to the horizontal plane;
a system for simulation of real reanimation arranged in said mannequin and including:
eye simulators arranged in said head unit;
simulators of a spontaneous pulse in the carotid arteries arranged in said neck unit;
a spontaneous respiratory motion simulator, arranged in said rib cage unit;
a unit for control of reanimation states, accommodated within the housing of said visual display and including:
an amplifier-converter whose output is connected to said unit for control of reanimation states, while the input of said amplifier-converter is connected to the aforesaid:
artificial respiration detector;
external heart massage detector;
mannequin head position detector;
detector of simulated rib fractures;
detector of simulated breast bone fracture;
detector of simulated multiple fractures of the rib cage;
detector of simulated fracture of xiphoid cartilage;
detector of simulated injuries of internal abdominal organs;
stomach decompression detector;
excessive stomach decompression detector;
detector of the position of the mannequin in relation to the horizontal plane;
a logical circuit connected to said unit for determination of reanimation states and to the output of said amplifier-converter;
a time interval generator connected to the output of said logical circuit;
a pulse counter connected to said logical circuit;
a switching unit connected to said unit for determination of reanimation states and to said pulse counter;
a simulator control circuit connected to said switching unit, to said unit of videosimulators, and to said system for simulation of real animation.

2. A training device as claimed in claim 1, wherein said neck unit is made as a hollow cylinder having an outer surface shaped like a human neck and which has an upper base and a lower base; wherein said upper base is connected by means of a hinge with an occipital part of said head unit, and said lower base is a concave hemisphere which is mated with a convex hemisphere of an upper part of said torso unit so as to form said hinged connection between said neck unit and said torso unit.

3. A training device as claimed in claim 2, wherein said detector of simulated multiple fractures of the rib cage caused by excessive efforts during heart massage comprises:
a permanent magnet disposed on the internal surface of said middle rigid panel of said rib cage unit; and
a magnetically operated contact disposed on said rear rigid panel of said rib cage unit, opposite said permanent magnet, and connected to said amplifier-converter.

4. A training device as claimed in claim 2, wherein each of said pulse simulators comprises:
a coil accommodated within said hollow cylinder of the neck unit, in the area of the carotid artery, and connected to said simulator control circuit; and
two metal cores, one of which is fixed by pressing into the interior of said coil, and the other core being accommodated within said coil for longitudinal motion therein.

5. A training device as claimed in claim 2, wherein said spontaneous respiratory motion simulator comprises:
an electromagnet, including:
a coil with a core, disposed on said middle panel of said rib cage unit and connected to said simulator control circuit;
a metal plate secured to said front rigid panel of said rib cage unit above said coil with a core.

6. A training device as claimed in claim 1, wherein said unit of videosimulators of vital internal human organs, comprises:
a rigid panel arranged within the housing of said visual display;
a relief outline disposed on said rigid panel to simulate the segmental section of a human head;
a relief outline disposed on said rigid panel to simulate the front section of a human torso;
a relief outline disposed on said rigid panel to simulate the cerebral hemisphere of a human brain;
a relief outline disposed on said rigid panel to simulate a human nasal-oral cavity;
a relief outline disposed on said rigid panel to simulate a human tongue;
a relief outline disposed on said rigid panel to simulate a human heart in systolic condition;
a relief outline disposed on said rigid panel to simulate a human heart in diastolic condition;

a relief outline disposed on said rigid panel to simulate human lungs containing a functional residual volume of air;

a relief outline disposed on said rigid panel to simulate human lungs filled with a normal volume of air;

a relief outline disposed on said rigid panel to simulate human lungs filled with an excessive amount of air;

a relief outline disposed on said rigid panel to simulate a stomach filled with air;

filament lamps disposed on said rigid panel within said relief outlines or contours and connected to said simulator control circuit;

filament lamps disposed on said rigid panel within said relief outline simulating the front section of a human torso in the region of lateral endings of human ribs and connected to said simulator control circuit;

filament lamp disposed on said rigid panel within said relief outline of the front section of a human torso in the area of the manubrium sterni and connected to said simulator control circuit;

a filament lamp disposed on said rigid panel within said relief outline of the front section of a human torso in the area of xiphoid cartilage and connected to said simulator control circuit;

a light guide disposed on said rigid panel within said relief outline simulating the segmental section of a human head and a carotid artery;

a light guide disposed on said rigid panel within said relief outline simulating the segmental section of a human head and a human oesophagus;

a light guide disposed on said rigid panel within said relief outline simulating the segmental section of a human head and a human trachea;

filament lamps disposed on said rigid panel within said light guides and connected to said simulator control circuit;

a panel made of semi-transparent material, disposed within said visual display housing above said light guides and relief outlines, and having an internal surface with an engraving of the skeletal frame of the rib cage; and a film slide with the color images of said internal organs, disposed between said semi-transparent panel and said relief outlines.

7. A training device as claimed in claim 1, wherein said artificial respiration detector comprises:
a metal sleeve disposed for longitudinal motion within said cylinder of the funnel;
a permanent magnet disposed in the occipital part of the head unit above said funnel cylinder; and
a hermetically sealed, magnetically controlled contact disposed in the occipital part of the head unit under said cylinder, opposite said permanent magnet, and connected to said amplifier-converter.

8. A training device as claimed in claim 1, wherein said external heart massage detector comprises:
a permanent magnet disposed on the internal surface of said middle rigid panel of said rib cage unit;
a magnetically controlled contact disposed on said rear rigid panel of said rib cage unit, opposite said permanent magnet, and connected to said amplifier-converter.

9. A training device as claimed in claim 1, wherein said mannequin head position detector comprises:
a permanent magnet disposed on said upper base of the cylinder constituting said neck unit; and a magnetically controlled contact disposed on said head unit in the area of the chin, opposite said permanent magnet, and connected to said amplifier-converter.

10. A training device as claimed in claim 1, wherein said detector of simulated breast bone fracture comprises:
a petal-shaped member made in the form of a cut in said front rigid panel of said rib cage unit in the area of the manubrium sterni;
a plate made of a resiliently compressible material and disposed on said front rigid panel; and
a switching element disposed on said plate, under said petal-shaped member in the area of the manubrium sterni, and connected to said amplifier-converter.

11. A training device as claimed in claim 1, wherein said detectors of simulated rib fractures comprise:
petal-shaped members made in the form of cuts in said front rigid panel of said rib cage unit, in the area of lateral rib endings;
plates made of a resiliently compressible material and disposed on said front rigid panel; and
a switching element disposed on said plates, immediately under said petal-shaped members arranged in the area of the lateral endings of human ribs, and connected to said amplifier-converter.

12. A training device as claimed in claim 1, wherein said detector of simulated fracture of xiphoid cartilage comprises:
a petal-shaped member made in the form of a cut in said front rigid panel of said rib cage unit, in the area of human xiphoid cartilage;
a plate made of a resiliently compressible material and disposed on said front rigid panel; and
a switching element disposed on said plate, immediately under said petal-shaped member provided in the area of human xiphoid cartilage, and connected to said amplifier-converter.

13. A training device as claimed in claim 1, wherein said detector of simulated injuries of internal abdominal organs due to heart compressions comprises:
a model of a waist belt clasp secured on the external surface of said front rigid panel of said rib cage unit and including:
a housing having a permanent magnet therein;
an insert disposed in said housing for longitudinal motion along a bottom part of said housing;
another permanent magnet disposed in said insert and forming a magnetically urged spring with said first permanent magnet disposed in said housing; and
a magnetically operated contact disposed on a wall of said housing, opposite said permanent magnet housed in said insert and connected to said amplifier-converter.

14. A training device as claimed in claim 1, wherein said full stomach simulator comprises:
an electromagnet, including:
a coil with a core, disposed on said middle rigid panel of said abdomen unit and connected to said simulator control circuit; and
a metal plate fixed to said front rigid panel of said abdomen unit above said coil with a core.

15. A training device as claimed in claim 1, wherein said stomach decompression detector comprises:
a permanent magnet disposed on said middle rigid panel of said abdoment unit; and a magnetically operated contact disposed on said rear rigid panel of said abdomen unit and connected to said amplifier-converter.

16. A training device as claimed in claim 1, wherein said excessive stomach decompression detector comprises:
   a permanent magnet disposed on said middle rigid panel of said abdomen unit; and
   a magnetically operated contact disposed on said rear panel of said abdomen unit and connected to said amplifier-converter.

17. A training device as claimed in claim 1, wherein said detector of the position of the mannequin in relation to the horizontal plane comprises:
   a frame disposed on said rear rigid panel of said abdomen unit and made in the form of an isosceles triangle with a vertex;
   a permanent magnet suspended from the vertex of said frame; and
   two magnetically operated contacts arranged in symmetrical relationship one opposite the other in walls of said frame and each connected to said amplifier-converter.

18. A training device as claimed in claim 1, wherein each of said eye simulators comprises:
   a housing accommodated within said head unit, the housing having a visible part simulating an eyeball and an iris of a human eye;
   a light filter accommodated within said housing to simulate a dilated pupil;
   a light guide arranged behind said light filter to simulate the iris of a human eye with a contracted pupil;
   a cylinder made of an opaque material and arranged at the centre of said light guide to simulate a contracted pupil; and
   a filament lamp accommodated within said housing under said light guide and connected to said simulator control circuit.

* * * * *